United States Patent [19]

Hölzer et al.

[11] 4,427,205

[45] Jan. 24, 1984

[54] RADIAL SHAFT SEALING RING

[75] Inventors: Helmut Hölzer, Weinheim; Peter Ehrmann, Hemsbach, both of Fed. Rep. of Germany

[73] Assignee: Firma Carl Freudenberg, Weinheim, Fed. Rep. of Germany

[21] Appl. No.: 399,798

[22] Filed: Jul. 19, 1982

[30] Foreign Application Priority Data

Dec. 19, 1981 [DE] Fed. Rep. of Germany ....... 3150472

[51] Int. Cl.³ .............................................. F16J 15/32
[52] U.S. Cl. ..................................... 277/134; 277/152
[58] Field of Search ................ 277/152, 153, 164, 134

[56] References Cited

U.S. PATENT DOCUMENTS 2,746,781  5/1956  Jones ................................... 277/152
4,283,064  8/1981  Staab et al. ......................... 277/134

Primary Examiner—Robert I. Smith
Attorney, Agent, or Firm—Kenyon & Kenyon

[57] ABSTRACT

A radial shaft sealing ring is disclosed. The sealing ring comprises a flat circular sealing element fabricated from a polymer material. The outer circumferential region of sealing element is mounted in a holding ring which surrounds the shaft. The sealing element is curved from the outer circumferential region to the inner circumference in the direction toward the sealed off medium with the sealing element being expanded away from the shaft in the region adjacent the inner circumference. The sealing element contacts the shaft intermediate the outer circumferential region and the expanded inner circumference region thereby providing a circular sealing contact area. The sealing element curvature provides an increasing inside diameter for the sealing element along the axial distance of the shaft from the circular sealing contact area to the expanded inner circumference. The inner circumferential area may be provided with swirl fins.

11 Claims, 3 Drawing Figures

RADIAL SHAFT SEALING RING

FIELD OF INVENTION

The present invention relates to radial shaft sealing rings. More particularly, the present invention relates to a radial shaft sealing ring comprising a flat circular sealing element of polymer material which is anchored in the region of its outside circumference in a holding ring. The sealing element is curved forward toward the region of its inside circumference in the direction toward the sealed-off medium, whereby the backside of the curvature intermediate the outside and inside circumference contacts the shaft with a circular sealing contact area.

BACKGROUND OF THE INVENTION

A prior art radial shaft sealing ring is disclosed in DE-AS 23 39 353. The backside of the sealing element of this prior art sealing ring has freely protruding fiber ends which are oriented in the direction of the sealed-off medium. In the region of the contact area, the fiber ends lie against the sealed-off shaft and are deflected sideways under the influence of friction if there is a rotary movement, whereby a dynamic return effect aiding the sealing action is exerted on the sealed-off medium penetrating into the sealed zone. If the shaft is standing still, this effect ceases and undesirable leakage can be the result.

The effectiveness of this prior art seal is further greatly influenced by the fact that the fiber ends, in addition to high mobility, have a certain amount of elasticity. Both properties depend greatly on the available cross section and they are impaired when a reduction in cross section occurs due to wear. Thus, these prior art radial shaft sealing rings have a disadvantageous steadily decreasing dynamic sealing effect during their useful life.

OBJECT OF THE INVENTION

It is an object of the present invention to provide a radial shaft sealing ring which is simple to manufacture and has a highly effective static as well as dynamic sealing behavior which does not change appreciably during the useful life of the seal.

These and other objects will become apparent from the following description and claims in conjunction with the drawing.

SUMMARY OF THE INVENTION

According to the present invention, an improved radial shaft sealing ring is provided wherein the sealing element is extended in the direction toward the sealed-off medium beyond the sealing contact surface and wherein the sealing element has an increasing inside diameter in the protruding part which extends beyond the sealing contact surface.

The present invention may be generally described as a radial shaft sealing ring for sealing off a medium comprising:

a holding ring surrounding said shaft;

a flat circular sealing element fabricated from a polymer material having an outer circumferential region and a bore therethrough defining an inner circumference for providing a passage for said shaft; wherein, said outer circumferential region of said sealing element is mounted in said holding ring;

said sealing element is curved from said outer circumferential region to said inner circumference in the direction toward said sealed-off medium whereby said sealing element surrounds said shaft with a variable inside diameter;

said sealing element is expanded away from said shaft in the region adjacent said inner circumference;

said sealing element contacts said shaft intermediate said outer circumferential region and said inner circumference thereby providing a circular sealing contact area; whereby said sealing element curvature provides an increasing inside diameter of said sealing element along the axial distance of said shaft from said circular sealing contact are to said expanded inner circumference.

BRIEF DESCRIPTION OF THE DRAWING

In the drawing forming part hereof

DESCRIPTION OF THE PREFERRED EMBODIMENT

Figure 1:
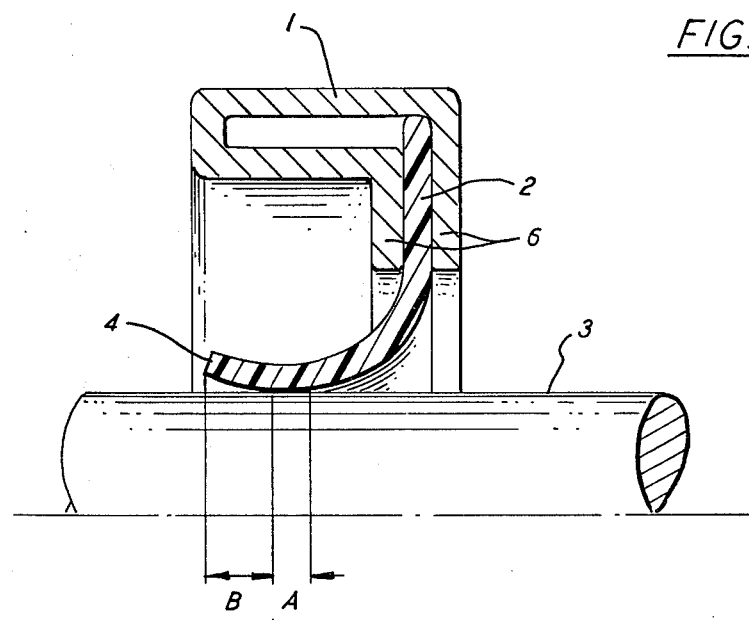
FIG. 1 is a schematic half sectional view of one embodiment of a radial shaft sealing ring in accordance with the present invention.

In order to afford a complete understanding of the present invention and an appreciation of its advantages, a description of the preferred embodiments is presented below.

The sealing element of the radial shaft sealing ring of the present invention lies on the sealed-off shaft in the region of the sealing contact area with only a small pressure. This pressure decreases continuously on both sides of a central zone of maximum pressure until the sealing element is completely lifted from the sealed-off shaft. Adjacent to both sides of the contact area proper, there is a steadily increasing gap. Thus, there is a capillary effectiveness which reaches its maximum in the zone of the highest pressure and which drops steadily to zero on both sides along the axial direction of the sealed-off shaft. Accordingly, the film of lubricant in the region of the contact area is distinguished by a particularly high mechanical strength which reliably prevents direct frictional contact coming about between the shaft surface wetted with lubricating oil and the sealing element. It is believed that this is the reason why the wear of the radial shaft sealing ring, in accordance with the present invention, is extremely small. The applicant, however, does not wish to be bound by any theory of invention.

The radial shaft sealing ring, in accordance with the present invention, has also been found to be relatively insensitive to radial shaft movements and vibrations and to heavier contamination stresses.

If the shaft is rotating, the lubricating film in the vicinity of the sealing zone is subjected to constant circulation due to the subzones along the axial direction of different pressure. This circulation includes axial as well as radial flows. The film of lubricant is therefore continuously renewed from the reservoir of the sealed-off medium. Accordingly, decomposition effects, which must be expected if the heat removal is insufficient, is prevented to a very great extent even at high shaft speeds.

In accordance with one advantageous embodiment of the present invention, the sealing element has swirl fins on the base surface facing the sealed-off medium. The swirl fins can be designed continuously or intermittently merging into each other. They can be obtained in a particularly simple manner by using a sealing element in the form of a washer have plane-parallel surfaces, the cutout or center base of which has a star-shaped profile or a profile bounded by curves. Because of the flared expansion and forward curvature of the inside diameter of the sealing element, such swirl fins are subjected to a reorientation of direction toward the direction of the sealed-off medium. They can therefore exert more direct influence on the pressure of the lubricant film within the sealing zone proper. These swirls are advantageous in that they isolate the sealing zone from pressure changes in the sealed-off medium. That is, if the pressure of the sealed-off medium changes, substantially constant pressure and lubrication conditions are maintained in the sealing zone proper.

The radial displacement of the swirl fins from the shaft can substantially correspond with the axial location of the extension of the sealing element beyond the sealing contact zone. That is, the swirl fins may be employed with the previously described embodiment of the invention having a steady increase of the inside diameter of the sealing element in the region of the extension beyond the sealing contact zone. The specific shape of the sealing element required in other designs can therefore be eliminated in this region.

The angle which is enclosed between the opposite surfaces of the extension with the sealing ring in the installed condition, is advantageously between 0.5° to 20°. The range between 3° and 6° is particularly advantageous.

The contact area as well as the regions adjacent thereto in the axial direction on both sides of the sealing ring have preferably a smooth surface and merge uniformly with each other. This greatly aids the gap effect which is essential for the static and dynamic sealing action. Interactions between the sealed-off medium and the environment through the sealing zone, which frequently occur in prior art dynamic sealing rings, are effectively prevented by the sealing ring of the invention. Even at high shaft speeds, the shaft sealing ring of the present invention effectively prevents lubrication oil from passing through the sealing gap to the outside or dust from the environment from entering into the sealed space through the sealing gap.

The sealing element in accordance with the present invention preferably has a constant wall thickness. This may be obtained in a suitable design by simply punching the sealing element from a flat material, for example, from a web of rubber or PTFE.

The present invention will be now explained in greater detail making reference to the drawings.

The radial shaft sealing ring, in accordance with one embodiment of the present invention illustrated in FIG. 1, comprises a stiffening ring or holding ring 1 suitably fabricated from sheet steel. The disc-like sealing element 2 may be suitably fabricated from rubber. It has circular shape and may be manufactured by punching from a flat web of an elastomer material such as rubber material with, for example, a Shore A hardness of 72.

The inside diameter of the washer-like sealing element 2 is curved forward to one side in the direction toward the sealed-off medium and is expanded in the radial direction. The expansion is made so that the sealing element 2 contacts the sealed-off shaft 3 only in the region of the contact area A. The latter has an axial distance B from the base area 4. The base area 4 is essentially the inside circumference of the washer-like sealing element 2 expanded away from the shaft 3. The contact area of the sealing element and the areas of the sealing element adjacent both sides of the contact area in the axial direction are made with smooth surfaces and merge steadily with each other with a curvature. If the sealed shaft 3 is wetted by lubricating oil, considerable capillary forces become active in the region of the zone A and lead to the development of a stable film of lubricant. The part of the sealing element adjacent to the contact area on the side away from the pressure or sealed-off medium is advantageously curved less than the corresponding part on the side facing the sealed-off medium. The ratio of the respective radius of curvature is advantageously 1 to 5 and preferably 1 to 3.

It will be appreciated that as one proceeds in the axial direction of the shaft 3 from the contact area A toward the base area 4, the radial displacement of the sealing element from the shaft 3 will increase. The increase will be determined by the radius of curvature.

Figure 2:
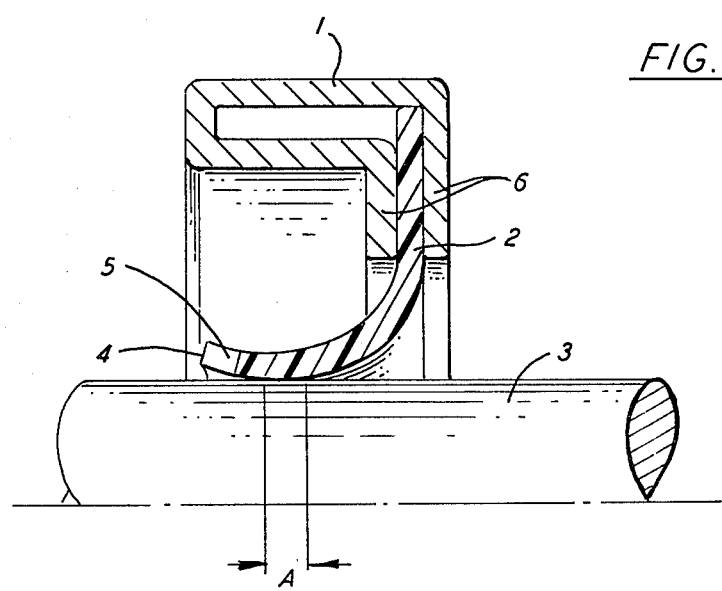
FIG. 2 is a schematic half sectional view of another embodiment of a radial shaft sealing ring in accordance with the present invention.

FIG. 2 illustrates an alternate embodiment of the present invention similar to that of FIG. 1 with the exception that the base area 4 is broken by a multiplicity of swirl fins 5 uniformly distributed over the circumference. The swirl fins, seen from the circumference, have a profile in sine form and cross into one another evenly. They suitably enclose with the axis of rotation and the direction of the sealed-off medium an obtuse angle of 90.5° to 100°, and preferably of 93° to 95°. This effectively counteracts any substantial influence on the flow condition in the sealing gap if the pressure of the sealed-off medium changes.

Figure 3:
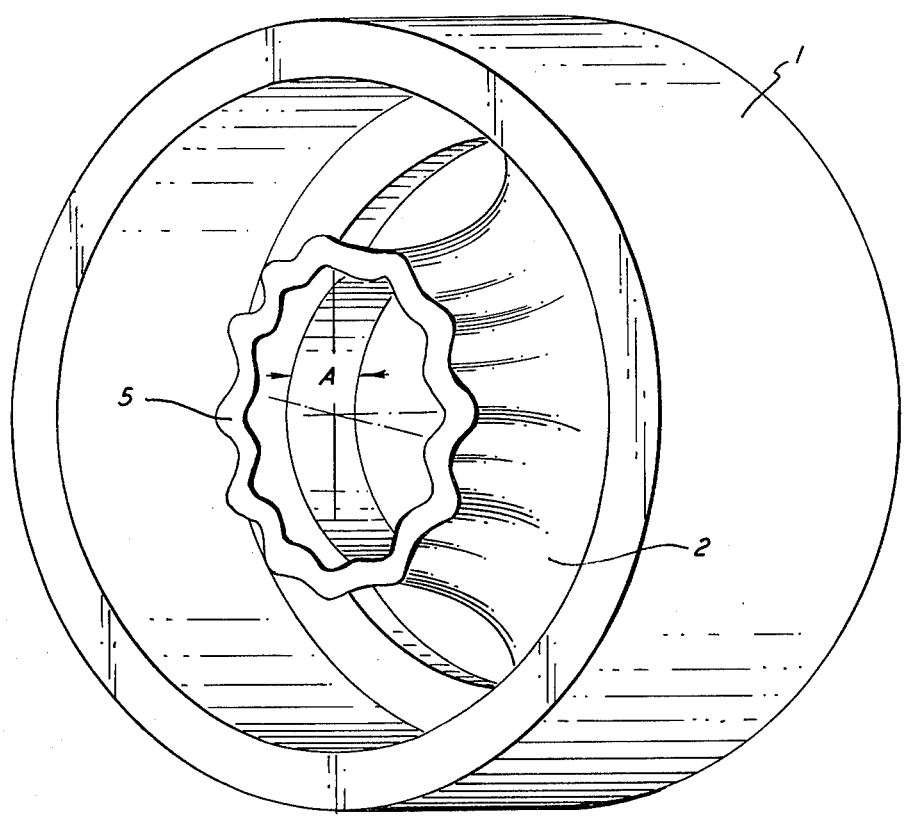
FIG. 3 is a perspective view of the radial shaft sealing ring of the embodiment of the present invention illustrated in FIG. 2.

FIG. 3 serves to further illustrate the embodiment of the invention illustrated in FIG. 2. It can be seen that the swirl fins have a negative inclination. The back-pumping effect is active only in the axial direction and can have no influence on the pressure and flow conditions in the region of the contact surface A with the sealed-off shaft.

Although preferred embodiments of the present invention have been described in detail, it is contemplated that modifications may be made within the spirit and scope of the invention.

What is claimed is:

1. A radial shaft sealing ring for sealing off a medium comprising:
   a holding ring surrounding said shaft;
   a flat circular sealing element fabricated from a polymer material having an outer circumferential region and a bore therethrough defining an inner circumference for providing a passage for said shaft; wherein,
   said outer circumferential region of said sealing element is mounted in said holding ring;
   said sealing element is curved from said outer circumferential region to said inner circumference in the direction toward said sealed-off medium whereby said sealing element surrounds said shaft with a variable inside diameter;

said sealing element is expanded away from said shaft in the region adjacent said inner circumference;

said sealing element contacts said shaft intermediate said outer circumferential region and said inner circumference thereby providing a circular sealing contact area wherein said sealing element is absent additional mechanical means urging compressive contact of said sealing element with said shaft intermediate said inner circumferential region and said outer circumferential region; whereby said sealing element curvature provides an increasing inside diameter of said sealing element along the axial distance of said shaft from said circular sealing contact area to said expanded inner circumference.

2. A radial shaft sealing ring as recited in claim 1 wherein said inner circumference has an irregular shape thereby providing swirl fins on the expanded inner circumference facing the sealed-off medium.

3. A radial shaft sealing ring as recited in claim 2 wherein said inner circumference irregular shape is a profile bounded by curves whereby said swirl fins merge into each other.

4. A radial shaft sealing ring as recited in claim 2 or 3 wherein the distance of said swirl fins from said shaft increases along the axial distance from said sealing contact area to said expanded inner circumference.

5. A radial shaft sealing ring as recited in claim 1 wherein said inside diameter of said sealing element steadily increases along the axial distance of said shaft from said sealing contact area to said expanded inner circumference.

6. A radial shaft sealing ring as recited in claim 1 or 5 wherein the angle enclosed by opposite surfaces of the extension of the sealing element from said sealing contact area to said inner circumference is about 0.5° to 20°.

7. A radial shaft sealing ring as recited in claim 1 or 5 wherein the regions of the sealing element adjacent both sides of said sealing contact area have a smooth surface and merge smoothly with each other.

8. A radial shaft sealing ring as recited in claim 1 or 5 wherein said sealing element has a constant wall thickness.

9. A radial shaft sealing ring as recited in claim 2 or 3 wherein said swirl fins form an angle of about 90.5° to 110° between the axis of rotation and the direction of the sealed off medium.

10. A radial shaft sealing ring as recited in claim 1 or 5 wherein the regions of the sealing element adjacent both sides of said sealing contact area in the axial direction are curved and merge smoothly with each other.

11. A radial shaft sealing ring as recited in claim 10 wherein the curvature of the sealing element region facing the sealed off medium has a smaller radius of curvature than the radius of curvature of the region of the sealing element facing away from the sealed-off medium.

* * * * *

UNITED STATES PATENT AND TRADEMARK OFFICE
CERTIFICATE OF CORRECTION

PATENT NO. : 4 427 205
DATED : January 24, 1984
INVENTOR(S) : HELMUT HÖLZER ET AL It is certified that error appears in the above—identified patent and that said Letters Patent is hereby corrected as shown below:

In Column 4, line 38, change "...100°" to read

-- 110° --

Signed and Sealed this

Twenty-fourth Day of April 1984

[SEAL]

Attest:

GERALD J. MOSSINGHOFF

Attesting Officer    Commissioner of Patents and Trademarks